United States Patent
Sabouri et al.

(10) Patent No.: US 6,925,172 B2
(45) Date of Patent: Aug. 2, 2005

(54) LINE INTERFACE WITH GAIN FEEDBACK COUPLED MATCHING IMPEDANCE

(75) Inventors: Faramarz Sabouri, Lawrenceville, NJ (US); John P. Guido, Bethlehem, PA (US); John G. Kenney, Jr., Princeton Junction, NJ (US)

(73) Assignee: Analog Devices, Inc., Norwood, MA (US)

( * ) Notice: Subject to any disclaimer, the term of this patent is extended or adjusted under 35 U.S.C. 154(b) by 140 days.

(21) Appl. No.: 10/056,558

(22) Filed: Jan. 25, 2002

(65) Prior Publication Data

US 2002/0151280 A1 Oct. 17, 2002

Related U.S. Application Data

(60) Provisional application No. 60/265,786, filed on Feb. 1, 2001.

(51) Int. Cl.[7] .............................. H04M 1/00; H04M 9/00
(52) U.S. Cl. ............................ 379/399.01; 379/399.02; 379/388.07; 379/390.03; 379/390.04; 379/391; 379/392; 379/394; 379/398
(58) Field of Search ........................... 379/399.01, 345, 379/402

(56) References Cited

U.S. PATENT DOCUMENTS

| | | | |
|---|---|---|---|
| 5,245,654 A | | 9/1993 | Wilkinson et al. |
| 5,528,630 A | * | 6/1996 | Ashley et al. ............... 375/258 |
| 5,822,426 A | | 10/1998 | Rasmus et al. |
| 5,838,722 A | | 11/1998 | Consi |
| 6,028,487 A | * | 2/2000 | Kakuta et al. ............... 330/311 |

FOREIGN PATENT DOCUMENTS

| | | |
|---|---|---|
| EP | 0 868 035 A2 | 9/1998 |
| EP | 1 111 865 A2 | 6/2001 |

OTHER PUBLICATIONS

"Line–Driver Design for Broadband Communications Applications," Eamon Nash. *Electronics Design.* Sep. 2, 1997.

\* cited by examiner

*Primary Examiner*—Xu Mei
*Assistant Examiner*—Ramnandan Singh
(74) *Attorney, Agent, or Firm*—Gauthier & Connors LLP

(57) ABSTRACT

A transceiver system is disclosed for use in a telecommunication system. The transceiver system includes a transmission circuit including a transmitter input coupled to an input of a transmission amplifier, a receiver circuit including a receiver output coupled to an output of a receiver amplifier, and a transmission line interface circuit that is coupled to an output of the transmission amplifier and to an input of the receiver amplifier. The transmission line interface circuit includes a matching impedance that is directly coupled to a feedback path of the transmission amplifier and that terminates the transmission line of the transceiver system.

12 Claims, 2 Drawing Sheets

US 6,925,172 B2

LINE INTERFACE WITH GAIN FEEDBACK COUPLED MATCHING IMPEDANCE

PRIORITY INFORMATION

This application claims priority to U.S. Provisional Patent Application Ser. No. 60/265,786 filed Feb. 1, 2001.

BACKGROUND OF THE INVENTION

The present invention generally relates to the field of transceivers for telecommunication systems, and particularly relates to transceivers for telecommunications that are efficient and inexpensive to produce.

Transceivers for telecommunication systems typically include a transmit path and a receive path. The transmit path typically includes a transmitter amplifier stage and a line driver and receive path typically includes a receiver amplifier stage that is coupled to the transmission line.

As telecommunication systems continue to become smaller and more ubiquitous, there continues to be a need for a transceiver circuit that is efficient and inexpensive to produce. There is also a need for a transceiver circuit that reduces required surface area in printed circuit boards. There is further a need for a transceiver circuit that provides reduced power consumption.

SUMMARY OF THE INVENTION

The invention provides a transceiver system for use in a telecommunication system. The transceiver system includes a transmission circuit including a transmitter input coupled to an input of a transmission amplifier, a receiver circuit including a receiver output coupled to an output of a receiver amplifier, and a transmission line interface circuit that is coupled to an output of the transmission amplifier and to an input of the receiver amplifier. The transmission line interface circuit includes a matching impedance that is directly coupled to a feedback path of the transmission amplifier and that terminates the transmission line of the transceiver system.

BRIEF DESCRIPTION OF THE DRAWINGS

The following description may be further understood with reference to the accompanying drawings in which.

The drawings are shown for illustrative purposes.

DETAILED DESCRIPTION OF THE INVENTION

The invention provides an architecture for a line interface including a transmit path and a receive path. The transmit path includes a line driver and a matching impedance that terminates the line. The transfer function of the line driver may be shaped as a first-order high-pass filter to reject any out-of-band noise and distortion components, if needed in the application. The receive signal appearing on the matching impedance is bootstrapped through multiple feedbacks to create a much larger termination impedance on the line. The matching impedance may, for example, be 10% of the termination impedance. A transmission amplifier, which drives both the line and the matching impedance, achieves high efficiency from the point-of-view of power consumption as the matching impedance is a small fraction of the line termination impedance.

The receive path includes a hybrid network and a difference amplifier. The hybrid network acts as a selective filter and prevents the transmit signal from leaking into the receive path, thereby limiting the dynamic range. The difference amplifier subtracts the signal across the line from a replica of the transmit signal in order to reject the transmit signal and amplify the received signal from the line.

The invention provides, in an embodiment, a full rate asymmetric digital subscriber line (ADSL) modem to be used for the central office in a telecommunication transceiver circuit. Systems of the invention, however, may be used for a variety of other applications.

The line driver architecture of the invention provides a matched output impedance to the line and achieves a high-efficiency operation. Although the circuit shown in FIG. 1 employs an inverting transmitter gain from the input to the output, various other systems may be developed in accordance with the invention that provide a non-inverting gain from the input to the output of the transmitter circuit. For example, the system may be used with either a voltage or a current feedback architecture, and may be implemented with a single-ended or a differential architecture. When implemented as a differential architecture, the matching impedance may be realized by a single impedance thereby realizing a significant savings in printed circuit board area since conventional differential architectures required two matching impedances.

Figure 1:
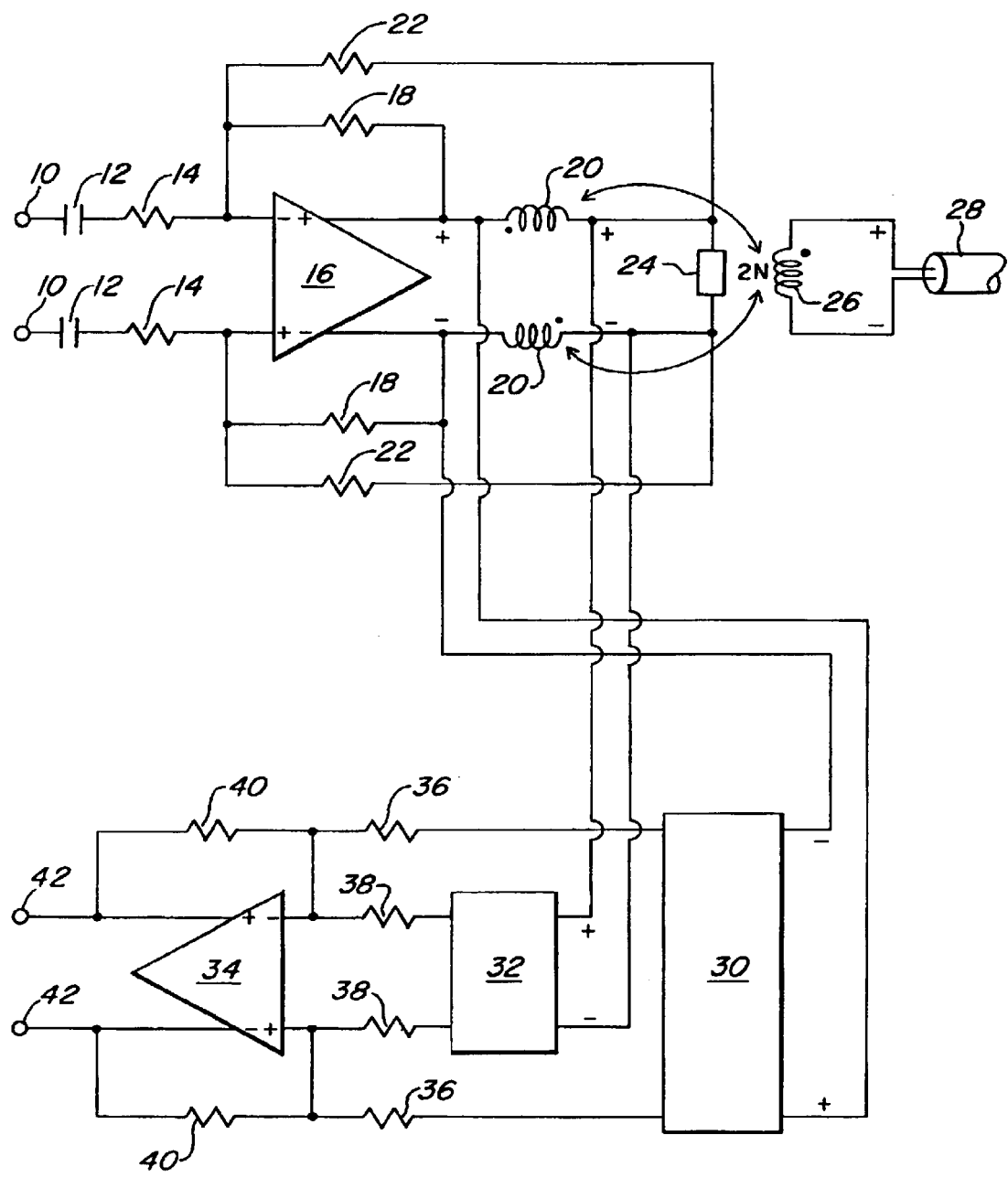
FIG. 1 shows an illustrative view of a transceiver circuit in accordance with an embodiment of the invention.

As shown in FIG. 1, a transceiver circuit in accordance with an embodiment of the invention for use as a modem front end may include a fully differential voltage feedback implementation of a line driver, a single transformer hybrid, a single matching impedance, and a receive path amplifier. The transmission path includes a pair of capacitors 12 ($C_1$) and a pair of resistors 14 ($R_1$) in the input path from a transmission input port 10 to a transmitter amplifier 16. A first feedback path from the output of the amplifier 16 includes a pair of resistors 18 ($R_2$). The output of the amplifier 16 is serially passed through the primary winding 20 of the transformer, and a second amplifier feedback path from across the matching network 24 includes another pair of resistors 22 ($R_3$) as shown. The circuit further includes a small matching impedance 24 ($Z_M$), and the circuit is coupled to a transmission line 28 via the secondary winding 26 of the transformer. The impedance $Z_M$ may be comprised of a wide variety of circuit elements in various embodiments such as a single resistor or two or more resistors and/or capacitors in series, and may include fixed zero or non-zero reference voltages.

The receive path of the transceiver circuit of FIG. 1 includes a first filter 30 that is coupled to the output of the amplifier 16, and a second filter 32 that is coupled to the voltage across the matching network 24. The outputs of the first filter 30 are input to a receiver amplifier 34 through series resistors 36 ($R_4$), and the outputs of the second filter 32 are input to the amplifier 34 through series resistors 38 ($R_5$). The negative feedback path from each input to each output of the amplifier 34 includes a series resistor 40 ($R_6$), and the output of the amplifier 34 is provided to a receiver output port 42 as shown.

The dual negative feedback network of the transmission path boosts the small impedance of the matching network ($Z_M$) to a much larger line driver output impedance to match the characteristic impedance of the transmission line. Matched termination of the line improves transmission efficiency for the received signal. While the matching impedance manifests itself significantly larger to the received signal, it appears with its actual value for the transmit signal. As a result, by using a small matching impedance, only a small fraction of the total power is consumed by the matching impedance and an efficient operation is achieved. The line driver, therefore, is implemented in a fully differential voltage feedback structure with a single matching impedance and a first order high pass transfer function.

The values of the resistors $R_1$, $R_2$, $R_3$ set the gains from the input at port 10 ($V_{IN}$) to the output of the amplifier 16 ($V_{OPAMP}$) and also to the voltage across the line ($V_{LINE}$) that appears across the primaries of the transformer 26. In addition, the transmit signal appears across the same winding. When the matching impedance ($Z_M$) is a fraction of the line impedance ($Z_L$), there is a unique linear combination of the voltages across the output of the amplifier 16 ($V_{OPAMP}$) and the matching impedance voltage ($V_M$) which leads to complete rejection of the transmit echo from the receive path. The same signal path is used by the signal received from the line to reach the receive amplifier. The received signal usually faces some attenuation which should be compensated by low-noise amplification in the receive path. Capacitors 12 ($C_1$) implement a first order HPF at no additional cost, noise or power consumption. The design analysis is as follows.

The power savings may be analyzed as follows. The ratio of the matching impedance to the line characteristic impedance is:

$$k=Z_M/(Z_L')$$

where $Z_L'=Z_L/N^2$ is the total reflected line impedance as seen from both primaries together. In the above equation, 2N:1 represents the turns ratio of the secondary to each primary of the transformer, as shown in FIG. 1.

The voltage gain from the transmitter input to the amplifier output (excluding the filter capacitors) may be represented as:

$$\frac{V_{OPAMP}}{V_{IN}} = -\frac{R_2}{R_1}\frac{1}{1+\frac{k}{k+1}\frac{R_2}{R_3}}$$

The voltage gain from the input to line (excluding the filter capacitors) may be represented as:

$$\frac{V_{LINE}}{V_{IN}} = \frac{N}{k+1}\frac{V_{OPAMP}}{V_{IN}}$$

The requirement for optimum hybrid rejection ($V_{RX}$) may be determined as follows. In order to reject the transmit signal and amplify the received signal from the line, a linear combination of $V_{OPAMP}$ and $V_M$ is needed as follows:

$$V_{RX}=AV_{OPAMP}-V_M$$

where the optimum gain A for complete rejection of the transmit signal is $A=k/(k+1)$.

The receive path gain may be described as:

$$\frac{V_{RX}}{V_{LINE}} = \frac{1}{N}\frac{AR_2+R_3}{R_2+R_3}$$

The output impedance of the line driver as experienced from the line ($Z_{IN}$) may be described as:

$$Z_{IN} = N^2 Z_M \left(1 + \frac{R_2}{R_3}\right)$$

In order to match the impedance of the line driver (as expressed in the above equation for $Z_{IN}$) to the line characteristic impedance ($Z_L$), we need to have:

$$\frac{R_2}{R_3} = \frac{1}{k} - 1$$

The high pass transfer function is achieved by the capacitors $C_1$, which help form a first order high pass transfer function for the line driver, with a zero at zero and pole at $p_1=1/(R_1C_1)$.

The receive path of the line interface includes the filters 30 and 32, and the difference amplifier 34. For a transmission line with well-defined characteristic impedance, the impedance of the matching network should be simply a scaled reflected-to-primary impedance ($Z_L'$) of the transmission line. For such a well-behaved case, constructing a simple matching network is trivial; and as long as the equation above for the gain A is valid, the hybrid rejection is correct. The four input difference amplifier shown in FIG. 1 without the input filter implements the relationship above for $V_{RX}$ by setting appropriate values for the input resistors.

If the self-inductance of the transformer winding makes an impedance comparable to the reflected line impedance ($Z_L'$), an inductor should be placed in parallel with the above matching impedance as well. The matching impedance should be:

$$Z_M=k(Z_L'\|4L_1s)$$

where $L_1$ is the inductance of each primary of the transformer when the other two windings are left open.

In various systems, the characteristic impedance of many commonly used transmission lines (e.g., twisted pair telephony transmission lines) is not always well defined as assumed above. Depending on the wire gauge, the length of the line and the number of bridge taps, the characteristic impedance may vary significantly. Realization of an impedance network with perfect matching to all lines is not always possible. In order to achieve reasonable transmit signal rejection from the receive path, the voltage across the matching impedance may be filtered by the filter 32 as shown in FIG. 1.

Figure 2:
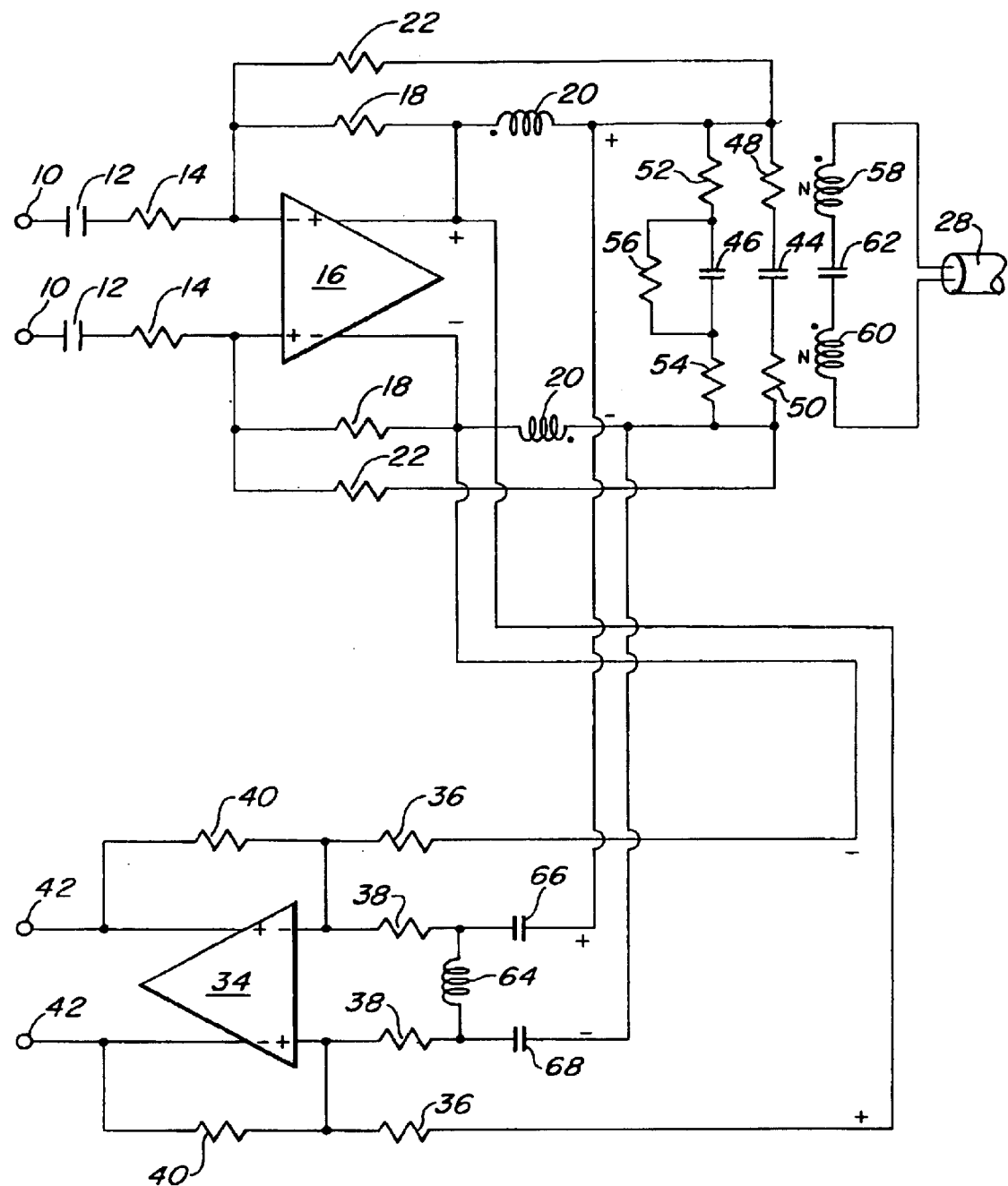
FIG. 2 shows an illustrative view of a transceiver circuit in accordance with another embodiment of the invention.

In another embodiment of the invention, a circuit may be employed in an asymmetrical digital subscriber line (ADSL) full-rate central office (C/O) modem as shown in FIG. 2. The system shown in FIG. 2 includes in the transmission path an amplifier 16 with capacitors 12 and resistors 14 in the input path from port 10, and feedback resistors 18 and 22 on either side of inductors 20 as discussed above with reference to FIG. 1. The system of FIG. 2 also includes in the receiver path an amplifier 34 coupled to a port 42 and having feedback resistors 40 that are coupled to resistors 36 and 38 as discussed above with reference to FIG. 1.

The transceiver circuit of FIG. 2 further includes an impedance network that includes two parallel paths across $V_M$, each of which includes a capacitor 44 ($C_3$) and 46 ($C_4$) as shown. The first path includes two serial resistors 48 ($R_{10}$) and 50 ($R_{11}$) on either side of the capacitor 44 ($C_3$). The second path also includes two serial resistors 52 ($R_7$) and 54 ($R_8$) on either side of capacitor 46 ($C_4$), and further includes another resistor 56 ($R_9$) in parallel with the capacitor 46 ($C_4$). The line side of the transformer coupling includes two windings 58 and 60 on either side of a capacitor 62 (C$_5$). The circuit also includes a specific embodiment of a filter 32 as shown in FIG. 1 including an inductor 64 (L2) across V$_M$ and two capacitors (C$_2$) 66 and 68, each of which is connected in series to one of the resistors 38 as shown in FIG. 2.

Both single ended and fully differential modes of implementation are possible in accordance with the invention for forming a non-inverting gain line driver with a bootstrapped load Z$_M$.

Those skilled in the art will appreciate that numerous modifications and variations may be made to the above disclosed embodiments without departing from the spirit and scope of the invention.

What is claimed is:

1. A transceiver system for use in a telecommunication system, said transceiver system comprising:
   a transmission circuit including a transmitter input coupled to an input of a transmission amplifier;
   a receiver circuit including a receiver output coupled to an output of a receiver amplifier;
   a transmission line interface circuit coupled to an output of said transmission amplifier and to an input of said receiver amplifier, said transmission line interface circuit including a matching impedance and first and second primary transformer windings such that said matching impedance is coupled to a first output of said transmission amplifier via said first primary transformer winding at one end of said matching impedance and is coupled to a second output of said transmission amplifier via said second primary transformer winding at a second end of said matching impedance, and that terminates the transmission line of said transceiver system;
   a first pair of negative feedback paths to said transmission amplifier, one of said first negative feedback paths extending from a first side of said first primary transformer winding, and another of said first negative feedback paths extending from a first side of said second primary transformer winding; and
   a second pair of negative feedback paths to said transmission amplifier, one of said second negative feedback paths extending from a second side of said first primary transformer winding, and another of said second negative feedback paths extending from a second side of said second primary transformer winding.

2. The system as claimed in claim 1, wherein said transmission line interface circuit further includes a secondary transformer winding.

3. The system as claimed in claim 1, wherein said transmission circuit provides a first order high pass filter function.

4. The system as claimed in claim 1, wherein said first primary transformer winding is directly coupled to said first output of said transmission amplifier and is directly coupled to said matching impedance, and said second primary transformer winding is directed to said second output of said transmission amplifier and is directly coupled to said matching impedance.

5. A transceiver system for use in a telecommunication system, said transceiver system comprising:
   a transmission circuit including a differential transmitter input coupled to a differential input of a transmission amplifier;
   a receiver circuit including a differential receiver output coupled to a differential output of a receiver amplifier;
   a transmission line interface circuit coupled to a differential output of said transmission amplifier and to a differential input of said receiver amplifier, said transmission line interface circuit including a single impedance matching network that terminates the transmission line of said transceiver system and is coupled at either end thereof to said differential output of said transmission amplifier via two primary transformer windings
   a first pair of negative feedback paths to said transmission amplifier, one of said first negative feedback paths extending from a first side of said first primary transformer winding, and another of said first negative feedback paths extending from a first side of said second primary transformer winding; and
   a second pair of negative feedback paths to said transmission amplifier, one of said second negative feedback paths extending from a second side of said first primary transformer winding, and another of said second negative feedback paths extending from a second side of said second primary transformer winding.

6. The system as claimed in claim 5, wherein said two primary transformer windings are each directly coupled to an output of said transmission amplifier and are each directly coupled to said matching impedance.

7. The system as claimed in claim 5, wherein said transmission circuit provides a first order high pass filter function.

8. The system as claimed in claim 5, wherein said transmission line interface circuit further includes a secondary transformer winding.

9. A line driver circuit for use in a transceiver system, said circuit comprising:
   a transmission line interface circuit that is coupled to an output of a transmission amplifier and to an input of a receiver amplifier, said transmission line interface including a single impedance matching network that terminates a transmission line of the transceiver system and is interposed in series between a first primary transformer winding and a second primary transformer winding;
   a first pair of negative feedback paths to said transmission amplifier, one of said first negative feedback paths extending from a first side of said first primary transformer winding, and another of said first negative feedback paths extending from a first side of said second primary transformer winding; and
   a second pair of negative feedback paths to said transmission amplifier, one of said second negative feedback paths extending from a second side of said first primary transformer winding, and another of said second negative feedback paths extending from a second side of said second primary transformer winding.

10. The system as claimed in claim 9, wherein said transmission line interface circuit further includes a secondary transformer winding.

11. A transceiver system for use in a telecommunication system, said transceiver system comprising:
    a transmission circuit including a differential transmitter input coupled to a differential input of a transmission amplifier;
    a receiver circuit including a differential receiver output coupled to a differential output of a receiver amplifier;
    a transmission line interface circuit coupled to a differential output of said transmission amplifier and to an differential input of said receiver amplifier, said transmission line interface circuit including a matching impedance that is coupled to a first negative feedback path of said transmission amplifier and a pair of primary transformer windings, each of which is coupled to said matching impedance and to an output of said transmission amplifier, and that terminates the transmission line of said transceiver system a first pair of negative feedback paths to said transmission amplifier, one of said first negative feedback paths extending from a first side of said first primary transformer winding, and another of said first negative feedback paths extending from a first side of said second primary transformer winding; and a second pair of negative feedback oaths to said transmission amplifier, one of said second negative feedback paths extending from a second side of said first primary transformer winding, and another of said second negative feedback oaths extending from a second side of said second primary transformer winding.

12. The system as claimed in claim 11, wherein said transmission line interface circuit further includes a secondary transformer winding.

* * * * *